United States Patent
Moon et al.

(10) Patent No.: US 11,260,401 B2
(45) Date of Patent: Mar. 1, 2022

(54) DUST COLLECTING MODULE, DESULFURIZING APPARATUS HAVING SAME, AND METHOD OF INSTALLING DUST COLLECTING MODULE

(71) Applicant: DOOSAN HEAVY INDUSTRIES & CONSTRUCTION CO., LTD., Changwon-si (KR)

(72) Inventors: Sangchul Moon, Seoul (KR); Jinwoon Lee, Gimhae-si (KR); Sangrin Lee, Changwon-si (KR); Joonhyuk Yim, Goyang-si (KR); Jaedong Hwang, Gunsan-si (KR)

(73) Assignee: Doosan Heavy Industries Construction Co., Ltd, Changwon-si (KR)

( * ) Notice: Subject to any disclaimer, the term of this patent is extended or adjusted under 35 U.S.C. 154(b) by 533 days.

(21) Appl. No.: 16/215,632

(22) Filed: Dec. 10, 2018

(65) Prior Publication Data

US 2020/0101471 A1    Apr. 2, 2020

(30) Foreign Application Priority Data

Oct. 1, 2018    (KR) .................. 10-2018-0117199
Oct. 4, 2018    (KR) .................. 10-2018-0118515

(51) Int. Cl.
*B03C 3/82*    (2006.01)
*B03C 3/12*    (2006.01)
(Continued)

(52) U.S. Cl.
CPC ............ *B03C 3/82* (2013.01); *B01D 53/1481* (2013.01); *B01D 53/185* (2013.01);
(Continued)

(58) Field of Classification Search
CPC combination set(s) only.
See application file for complete search history.

(56) References Cited

U.S. PATENT DOCUMENTS 2,273,194 A * 2/1942 Hedberg .................. B03C 3/16
                                                        95/66
2,369,877 A * 2/1945 White ...................... B03C 3/36
                                                        96/70
(Continued)

FOREIGN PATENT DOCUMENTS

JP    H08-103625 A    4/1996
JP    2000107637 A    4/2000
(Continued)

OTHER PUBLICATIONS

A Korean Office Action dated Aug. 13, 2019 in connection with Korean Patent Application No. 10-2018-0118515 which corresponds to the above-referenced U.S. application.
(Continued)

*Primary Examiner* — Christopher P Jones
*Assistant Examiner* — Sonji Turner
(74) *Attorney, Agent, or Firm* — Invenstone Patent, LLC

(57) ABSTRACT

A dust collecting module of a desulfurizing apparatus for removing sulfur oxides is easily installed and facilitates the application of a high voltage to discharge electrodes. The dust collecting module includes an arrangement of discharge electrodes and dust collecting electrodes alternately disposed and spaced apart from each other, the discharge electrodes configured to be charged to a predetermined voltage for generating a corona discharge between the discharge electrodes and the dust collecting electrodes; a first setting beam having a plurality of lower slots into which the discharge electrodes are securely inserted; and a lower frame extending in a stacking direction of the discharge electrodes to support the discharge electrodes, wherein the
(Continued)

predetermined voltage is applied to the discharge electrodes through the lower frame and the first setting beam. The dust collecting module may further include an insulating connecting member from which the lower frame is suspended.

10 Claims, 14 Drawing Sheets

(51) Int. Cl.
| | |
|---|---|
| *B03C 3/41* | (2006.01) |
| *B03C 3/47* | (2006.01) |
| *B03C 3/70* | (2006.01) |
| *B03C 3/013* | (2006.01) |
| *B01D 53/14* | (2006.01) |
| *B01D 53/18* | (2006.01) |
| *B01D 53/50* | (2006.01) |
| *B01D 53/73* | (2006.01) |
| *B01D 53/80* | (2006.01) |
| *B01D 53/32* | (2006.01) |

(52) U.S. Cl.
CPC ......... *B01D 53/323* (2013.01); *B01D 53/502* (2013.01); *B01D 53/73* (2013.01); *B01D 53/80* (2013.01); *B03C 3/013* (2013.01); *B03C 3/12* (2013.01); *B03C 3/41* (2013.01); *B03C 3/47* (2013.01); *B03C 3/70* (2013.01); *B01D 2251/404* (2013.01); *B01D 2257/302* (2013.01)

(56) References Cited

U.S. PATENT DOCUMENTS

| | | | | |
|---|---|---|---|---|
| 2,730,195 A | * | 1/1956 | Roberts | B03C 3/16 95/59 |
| 3,853,511 A | * | 12/1974 | Huppi | B03C 3/88 96/32 |
| 3,958,960 A | * | 5/1976 | Bakke | B03C 3/36 96/47 |
| 4,305,909 A | * | 12/1981 | Willett | B01D 47/06 422/169 |
| 4,439,216 A | * | 3/1984 | Perryman | B03C 3/34 323/903 |
| 4,602,921 A | * | 7/1986 | Shinohara | B03C 3/12 96/79 |
| 6,500,240 B1 | * | 12/2002 | Tomimatsu | B03C 3/16 96/27 |
| 6,602,329 B2 | * | 8/2003 | Tomimatsu | B03C 3/014 96/27 |
| 7,964,170 B2 | * | 6/2011 | Singh | B01D 53/864 423/224 |
| 8,790,444 B2 | * | 7/2014 | Ellis | B03C 3/14 95/65 |
| 9,821,320 B2 | * | 11/2017 | Ellis | B01D 53/1456 |
| 9,839,916 B2 | * | 12/2017 | Matsuura | B03C 3/41 |
| 10,532,364 B1 | * | 1/2020 | Moon | B03C 3/86 |
| 2003/0000384 A1 | * | 1/2003 | Tomimatsu | B03C 3/013 95/65 |
| 2010/0074828 A1 | * | 3/2010 | Singh | C01B 32/60 423/432 |
| 2015/0135949 A1 | * | 5/2015 | Matsuura | B03C 3/47 95/80 |

FOREIGN PATENT DOCUMENTS

| | | |
|---|---|---|
| JP | 2009034599 A | 2/2009 |
| JP | 2009095799 A | 5/2009 |
| KR | 100360417 B1 | 2/2003 |
| KR | 100818639 B1 | 4/2008 |
| KR | 10-1108123 B1 | 1/2012 |
| KR | 10-1478770 B1 | 1/2015 |
| KR | 10-1794628 B1 | 11/2017 |
| WO | WO-03000387 A1 * | 1/2003 ........... B01D 53/502 |

OTHER PUBLICATIONS

A Korean Office Action dated Aug. 12, 2019 in connection with Korean Patent Application No. 10-2018-0117199 which corresponds to the above-referenced U.S. application.

* cited by examiner

DUST COLLECTING MODULE, DESULFURIZING APPARATUS HAVING SAME, AND METHOD OF INSTALLING DUST COLLECTING MODULE

CROSS REFERENCE TO RELATED APPLICATIONS

The present application claims priority to Korean Patent Applications No. 10-2018-0117199, filed on Oct. 1, 2018, and No. 10-2018-0118515, filed on Oct. 4, 2018, the entire contents of which are incorporated herein for all purposes by this reference.

BACKGROUND OF THE INVENTION

1. Field of the Invention

The present invention relates to a dust collecting module for collecting dust contained in an exhaust gas, to a desulfurizing apparatus for removing sulfur oxides and employing the dust collecting module, and to a method of installing the dust collecting module.

2. Description of the Background Art

In general, acidic components such as hydrogen chloride (HCl), sulfur oxides (SOx), hydrogen fluoride (HF), and similar components, which are present in the exhaust gas generated during combustion of materials in steelworks or boilers in large-scale incineration plants or thermal power plants, cause air pollution and are harmful to the human body. Such components are removed from the exhaust gas through various methods.

The method for removing sulfur dioxide in the exhaust gas includes a dry desulfurization process in which dry powders, such as slaked lime or activated carbon, as a neutralizing agent are injected into and brought into contact with exhaust gas during the discharge of the exhaust gas to remove sulfur components from the exhaust gas, and a wet desulfurization process in which an absorption solution containing an aqueous slurry of caustic soda, magnesium hydroxide, or limestone, which is as a neutralizing agent, is sprayed onto and brought into contact with exhaust gas to remove sulfur components from the exhaust gas.

In wet desulfurization, the exhaust gas is gas-liquid contacted with an absorbing fluid containing an alkali such as lime, so that $SO_2$ is absorbed and removed from the exhaust gas. As a result, $SO_2$ absorbed from the exhaust gas forms sulfite in the absorbing fluid. In order to oxidize the sulfite to form a stable sulfite, it is conventional to oxidize the sulfite by blowing air into the absorbing fluid.

A conventionally used wet-type flue gas desulfurizing apparatus is a so-called oxidation tank type. In this type of apparatus, an oxygen-containing gas (typically air) is blown into the tank of an absorption tower, where the oxygen-containing gas is brought into contact with the slurry (containing a calcium compound such as lime) having sulfur dioxide absorbed therein to oxidize the sulfur dioxide in the tank.

The air discharged from the desulfurizing apparatus is removed by an electrostatic dust collector, which is installed separately from the desulfurizing apparatus to collect the dust contained in the flue gas.

Typically, in the electrostatic dust collector, the particulate matter is charged by the corona discharge of a discharge electrode, and the charged particulate matter is collected on a dust collecting plate by electrostatic force. The electrostatic dust collector has a large number of discharge electrodes and dust collecting electrodes. However, the consumed time and costs to install the discharge electrodes and the dust collecting electrodes are burdensome. Moreover, in order to individually install a large number of discharge electrodes and dust collecting electrodes in a large-scale structure, dangerous work must be performed in a high structure.

Particularly, the structure of connecting the discharge electrodes to a high voltage power source is complicated, and installation of the dust collecting module is difficult.

SUMMARY OF THE INVENTION

Accordingly, the present invention has been made keeping in mind the above problems occurring in the related art, and an object of the present invention is to provide a dust collecting module capable of being easily installed and of easily applying a high voltage to discharge electrodes. It is a further object to provide a desulfurizing apparatus for removing sulfur oxides and employing the dust collecting module and to provide a method of installing the dust collecting module.

According to an aspect of the present invention, a dust collecting module may include an arrangement of discharge electrodes and dust collecting electrodes alternately disposed and spaced apart from each other, the discharge electrodes configured to be charged to a predetermined voltage for generating a corona discharge between the discharge electrodes and the dust collecting electrodes; a first setting beam having a plurality of lower slots into which the discharge electrodes are securely inserted; and a lower frame extending in a stacking direction of the discharge electrodes to support the discharge electrodes, wherein the predetermined voltage is applied to the discharge electrodes through the lower frame and the first setting beam.

The dust collecting module may further include an insulating connecting member having a lower insulator and a high voltage support rod, and wherein the lower frame is suspended from the insulating connecting member.

The insulating connecting member may consist of a plurality of insulating connecting members, and the dust collecting module may further include a tubular girder through which the plurality of insulating connecting members are inserted such that the insulating connecting members are fixedly installed inside the tubular girder.

The discharge electrode may be provided with a first reinforcing rod extending in a width direction of the discharge electrode, and the first reinforcing rod may protrude from both ends of the discharge electrode and be supported by the first setting beam.

The first reinforcing rod may be provided with a support protrusion protruding through an upper surface of the first setting beam.

The first setting beam may include a tubular support tube having a circular cross section and a lower support plate fixed to a lower end of the support tube.

The first setting beam may include a lower beam including a bottom portion and two sidewalls protruding upwards from the bottom portion, the lower slots of the first setting beam being formed only in the two sidewalls; and an upper beam coupled to the lower beam, the upper support beam including a lower support portion contacting the bottom portion, an outer support portion bent from the lower support portion so as to abut an outer sidewall of the two sidewalls, an inclined portion bent from the outer support portion, an upper support portion bent from the inclined portion so as to be parallel with and spaced apart from the bottom portion, and an inner support portion bent downwards from the upper support portion.

The first reinforcing rod may be fixed to the lower beam of the first setting beam by a first weld, and the support protrusion may be fixed to the upper beam of the first setting beam by a second weld.

The dust collecting module may further include two second setting beams having a plurality of slots for maintaining a gap between the dust collecting electrodes; and a central setting beam provided between the two setting beams, and the dust collecting electrodes may be inserted into the central setting beam.

The dust collecting module may further include a second reinforcing rod installed on an upper portion of the dust collecting electrodes, such that the second reinforcing rod passes through the slots formed in the second setting beam.

According to another aspect of the present invention, there is provided a desulfurizing apparatus for removing sulfur oxides. The desulfurizing apparatus may include an absorption tower having an exhaust gas inlet and an exhaust gas outlet; a plurality of absorption solution supply pipes extending across the absorption tower, each absorption solution supply pipe having a spray nozzle; a dust collecting module including a plurality of discharge electrodes and dust collecting electrodes disposed on the absorption liquid supply pipes, such that the discharge electrodes and the dust collecting electrodes are erected in a height direction of the absorption tower, and a support network fixing the discharge electrodes and the dust collecting electrodes; and a frame assembly fixedly installed inside the absorption tower and coupled to the support network to support the dust collecting module.

The support network may include a first setting beam having a plurality of slots into which the discharge electrodes are inserted to maintain a gap between the discharge electrodes and to charge the discharge electrodes; and a second setting beam having a plurality of slots into which the dust collecting electrodes are inserted to maintain a gap between the dust collecting electrodes.

The first setting beam may include a lower beam including a bottom portion and two sidewalls protruding upwards from the bottom portion, the lower slots of the first setting beam being formed only in the two sidewalls; and an upper beam coupled to the lower beam, the upper support beam including a lower support portion contacting the bottom portion, an outer support portion bent from the lower support portion so as to abut an outer sidewall of the two sidewalls, an inclined portion bent from the outer support portion, an upper support portion bent from the inclined portion so as to be parallel with and spaced apart from the bottom portion, and an inner support portion bent downwards from the upper support portion.

The frame assembly may include a lower frame on which the first setting beam is mounted; and an insulating connecting member connected to the lower frame to supply a voltage while supporting the lower frame.

The insulating connecting member may consist of a plurality of insulating connecting members, each insulating connecting member including a lower insulator and a high voltage support rod, and the lower frame may suspended from the insulating connecting members. The frame assembly may further include a tubular girder through which the plurality of insulating connecting members are inserted, and the second setting beam may be mounted on the tubular girder.

The support network may include a plurality of first tie rods fixed to the discharge electrodes and installed to pass through the dust collecting electrodes, and a plurality of second tie rods fixed to the dust collecting electrodes and installed to pass through the discharge electrodes. The frame assembly may further include a plurality of upper supports to which some of the first tie rods are fixed, a plurality of lower supports to which some of the first tie rods are fixed, and a plurality of locking members connected to the upper supports to fixedly compress the upper supports inwards, the locking members being fixed to an inner wall surface of the absorption tower and internally having an upper insulator.

The absorption tower may have a cylindrical column section and a rectangular column section disposed above the cylindrical column section, and the dust collection module may be installed in the rectangular column section.

According to another aspect of the present invention, there is provided a method of installing a dust collecting module in an absorption tower. The method may include inserting a plurality of discharge electrode plates into a first setting beam having slots; inserting a plurality of dust collecting electrode plates into a second setting beam having slots; assembling a module by fixing the discharge electrode plates with a plurality of first tie rods and fixing the dust collecting electrode plates with a plurality of second tie rods; mounting the assembled module on a frame assembly installed inside the absorption tower; and fixing the first tie rods respectively to an upper support fixed to the frame assembly and to a lower support fixed to the frame assembly.

The module assembling may include fixing the discharge electrode plates by inserting the first tie rods into holes formed in the dust collecting electrode plates; and fixing the dust collecting electrode plates by inserting the second tie rods into holes formed in the discharge electrode plates. The first tie rods of a lower side may be fixed by being screwed to connectors provided on the lower support, and the first tie rods of an upper side may be fixed by being screwed to connectors provided on the upper support.

The method may further include compressing the upper support towards an inside of the dust collecting module.

As described above, according to the embodiment of the present invention, the dust collecting module is integrally formed with the support network for fixing the discharge electrodes and the dust collecting electrodes, and the support network is fixed to the frame assembly, thereby facilitating installation of the dust collecting module in the absorption tower.

Furthermore, the discharge electrodes are inserted into and fixed in the slots of the first setting beam, and the first setting beam is mounted on the lower frame, so that a voltage can be applied to the discharge electrodes through the lower frame and the first setting beam.

DETAILED DESCRIPTION OF THE INVENTION

Figure 1:
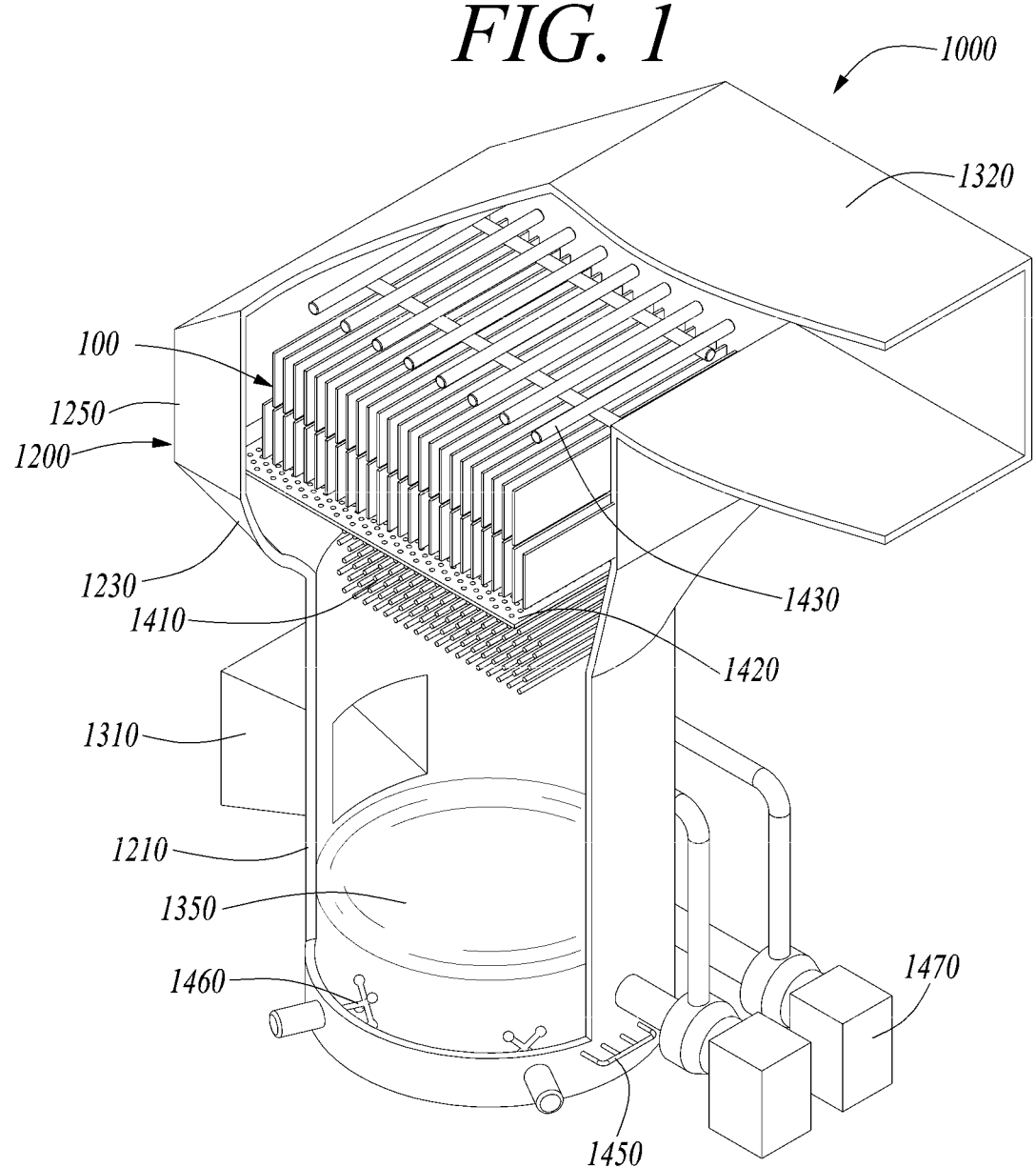
FIG. 1 is a view showing a desulfurizing apparatus according to a first embodiment of the present invention.

Hereinafter, exemplary embodiments of the present invention will be described in detail with reference to the accompanying drawings. However, it should be understood that the present invention is not limited to the disclosed embodiments, and includes all of modifications, equivalents, or substitutions falling within the spirit and scope of the invention.

The terminology used herein is for the purpose of describing particular embodiments only and is not intended to limit the invention. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, numbers, steps, operations, elements or a combination thereof, but do not preclude the presence or addition of one or more other features, numbers, steps, operations, elements or a combination thereof.

Reference will now be made in greater detail to a preferred embodiment of the invention, an example of which is illustrated in the accompanying drawings. Wherever possible, the same reference numerals will be used throughout the drawings and the description to refer to the same or like parts. In the following description, it is to be noted that, when the functions of conventional elements and the detailed description of elements related with the present invention may make the gist of the present invention unclear, a detailed description of those elements will be omitted. Further, the shape and size of the elements shown in the drawings may be exaggerated, omitted, or schematically drawn to provide an easily understood description of the structure of the present invention.

A desulfurizing apparatus of the present invention will now be described.

FIG. 1 shows a desulfurizing apparatus 1000 according to a first embodiment of the present invention.

Referring to FIG. 1, the desulfurizing apparatus 1000 is provided for removing sulfur components, i.e., sulfur oxides (SOx), which are contained in the exhaust gas discharged from a boiler of a plant facility such as a thermal power plant, using a gas-liquid contact between the exhaust gas and an absorption liquid.

The desulfurizing apparatus 1000 may include an absorption tower 1200, a plurality of absorption liquid supply pipes 1410, a plurality of absorption liquid pumps 1470, a stirrer 1460, an oxidizing air supply unit 1450, a perforated plate 1420 for removal of droplets, and a dust collecting module 100.

The absorption tower 1200 has a columnar shape having an inlet, an outlet, and an internal space, and serves to remove sulfur components and fine dust contained in the exhaust gas in the absorption tower 1200. The absorption tower 1200 is provided on a lower side with an inlet portion 1310 through which exhaust gas is introduced, and is provided on an upper side with an outlet portion 1320 through which is discharged exhaust gas with sulfur components and fine dust removed. The inlet portion 1310 has a tubular shape, and an exhaust gas generated by the combustion of fossil fuel such as coal in a boiler or the like is introduced into the absorption tower 1200 through the inlet portion 1310 and flows upward. The outlet portion 1320 may be formed from a rectangular tube which protrudes laterally from an upper end of the absorption tower 1200.

The absorption tower 1200 includes a cylindrical section 1210 having a circular cross section, a rectangular column section 1250 formed on the upper part of the column section 1210 and having a rectangular cross section, and an intermediate section 1230 connecting the cylindrical section 1210 and the rectangular column section 1250. The outlet portion 1320 is connected to the upper end of the rectangular column section 1250. A lower end of the intermediate section 1230 has a circular cross section, and an upper end of the intermediate section 1230 has a rectangular cross section.

The absorption liquid supply pipes 1410 supply a slurry of limestone, which is supplied to the lower portion of the absorption tower 1200, upwards to a spray nozzle (not shown) provided on the upper side of the absorption tower 1200, using a pumping force by the absorption liquid pump 1470, so as to allow the absorption liquid to be sprayed into fine droplets through the spray nozzle. The sprayed absorption liquid is brought into contact with and reacts with the exhaust gas. The unreacted absorption liquid falls and is stored and then is pumped and recirculated by the absorption liquid pump 1470.

The lower side of the absorption liquid pipes 1410 may be provided with a perforated plate 1420, a region where the sulfur-containing exhaust gas is brought into contact with and reacts with the fine droplets of the absorption liquid. This region is called a spray zone where the sulfur dioxide contained in the exhaust gas reacts with water to produce sulfurous acid, which in turn reacts with the limestone to neutralize to produce calcium sulfite. The produced calcium sulfite, water, and unreacted absorption liquid fall downward and are stored, and the absorption liquid is recirculated and reused.

Calcium sulfite is oxidized with oxygen and water to produce gypsum and sulfuric acid in a reservoir 1350, in which the absorption liquid is stored, at the lower part of the absorption tower 1200, and the sulfuric acid reacts with limestone again to neutralize to produce gypsum. A plurality of oxidizing air supply units 1450 are connected along the circumference of the bottom of the absorption tower 1200 at regular intervals for oxidation reaction.

In the meantime, an agitator 1460 is provided lower part of the absorption tower 1200 to accelerate the reaction by stirring the limestone slurry. In addition, a slurry supply pipe (not shown) for supplying slurry to the reservoir 1350 may be connected to the lower side of the absorption tower 1200.

A perforated plate 1420 for removing fine droplets may be installed on the upper side of the absorption liquid supply pipes 1410, specifically, in the intermediate section 1230.

A dust collecting module 100 and a frame assembly 20 for supporting the dust collecting module 100 are installed on the upper side of the perforated plate 1420. The dust collection module 100 may be configured such that two layers are stacked, as shown in FIG. 1, though the present invention is not limited to this configuration. That is, the dust collecting module 100 may be configured such that a single layer is formed or two or more layers are stacked.

A cleaning water supply unit 1430 for removing dust attached to dust collecting electrode 13 is installed on the upper side of the dust collecting module 100. However, the present invention is not limited to this configuration of the wash water supply unit 1430, which may be embodied by various conventional structures.

Figure 2:
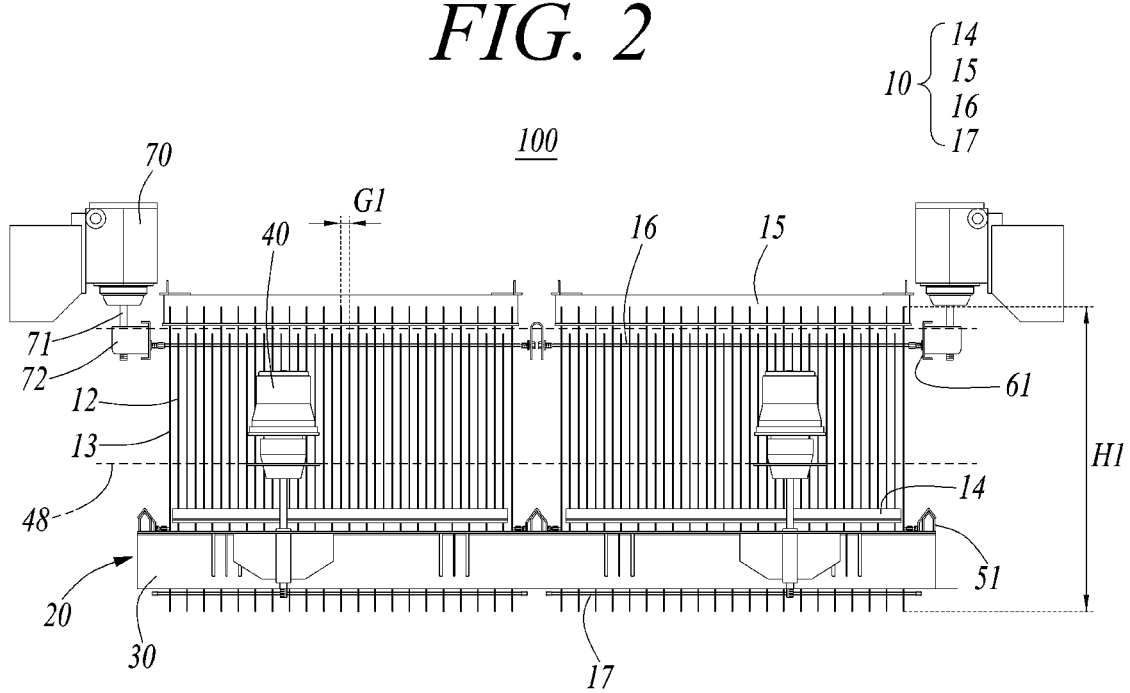
FIG. 2 is a side view showing a dust collecting module in the desulfurizing apparatus according to the first embodiment of the present invention.
Figure 3:
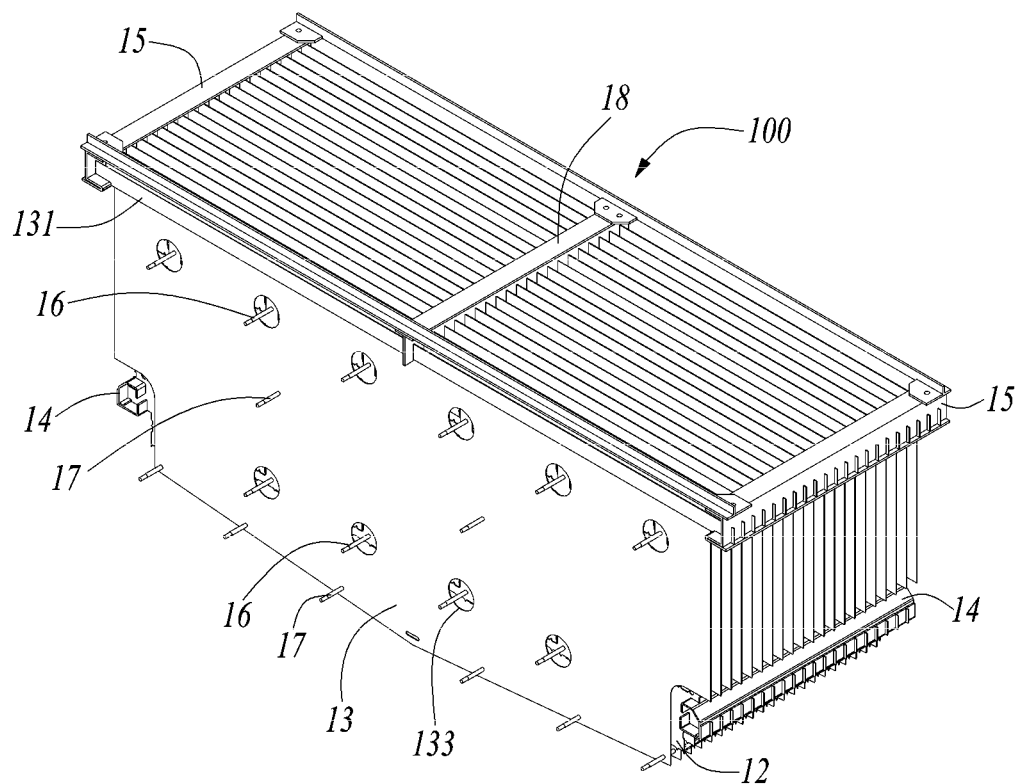
FIG. 3 is a perspective view showing the dust collecting module according to the first embodiment of the present invention.
Figure 4:
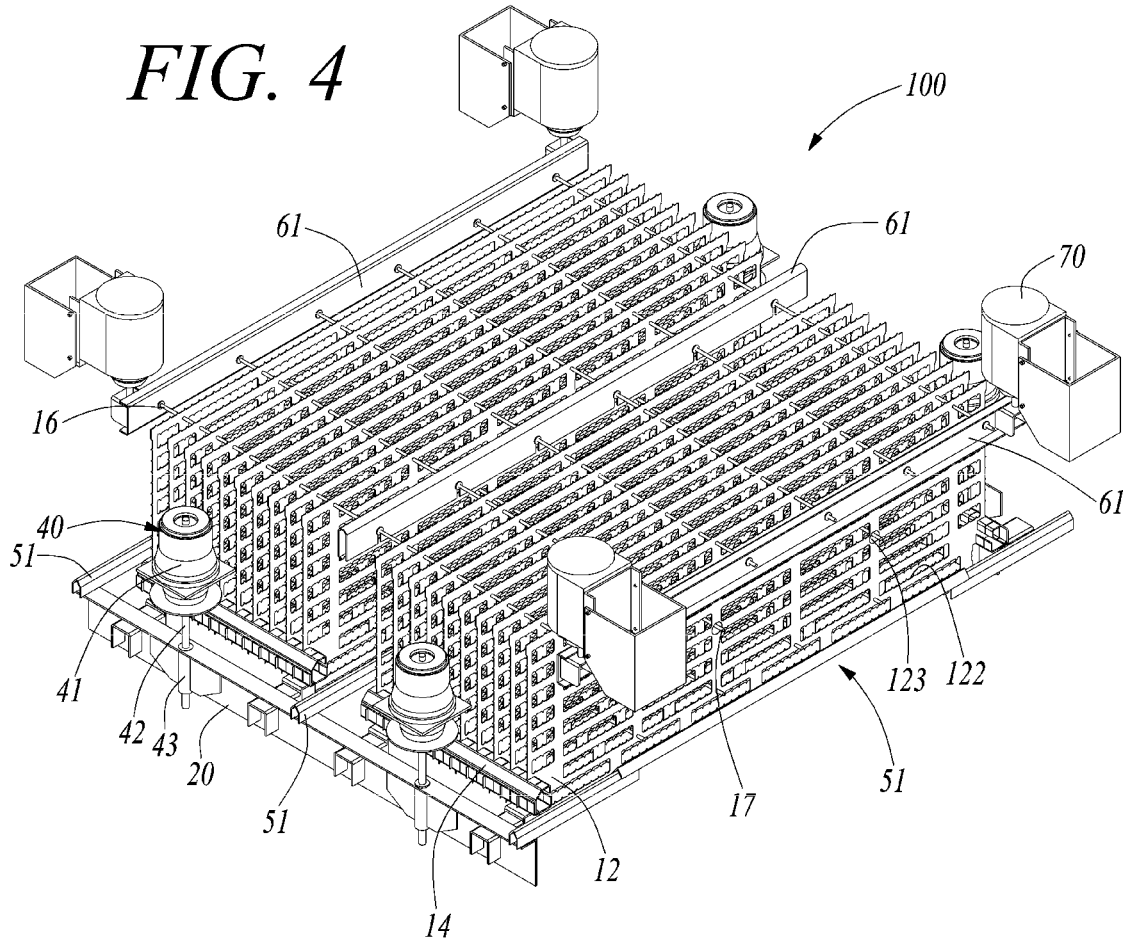
FIG. 4 is a perspective view showing a discharge electrode and a support network, and a frame assembly in the dust collecting module according to the first embodiment of the present invention.

FIG. 2 illustrates a dust collecting module 100 according to the first embodiment of the present disclosure, including a frame assembly 20, and FIG. 3 is a perspective view of the dust collecting module 100. FIG. 4 illustrates the discharge electrodes, support network, and frame assembly of the dust collecting module 100, while omitting the dust collecting electrodes for simplifying explanation.

Referring to FIGS. 2 to 4, the dust collecting module 100 includes a plurality of discharge electrodes 12, a plurality of dust collecting electrodes 13, and a support network 10 for fixing the discharge electrodes 12 and the dust collecting electrodes 13. The dust collecting module 100 may be placed into the absorption tower 1200 and installed on the frame assembly 20 while being fixed by the support network 10.

Each of the discharge electrodes 12 has the general shape of a flat plate forming one of a plurality of discharge fins which are spaced apart from each other, and each discharge electrode 12 is provided with a plurality of openings 122 throughout. Thus, the discharge fins are present and effective around each of the openings 122 as well as along the edges of the flat plate. Each opening 122 may have a substantially rectangular shape, and the discharge fins may each have a needle-shaped cross-section.

Each discharge electrode 12 includes a first reinforcing rod 121 (FIG. 5) provided on a lower side of the plate and coupled to the support network 10 to support the discharge electrode 12. The first reinforcing rod 121 is formed to be longer than the width of the discharge electrode 12 so as to protrude from both side ends of the discharge electrode 12. In addition, each discharge electrode 12 may be provided with a plurality of first holes 123 through which the second tie rods 17 pass.

Each collecting electrode 13 has the general shape of a flat plate and is provided with a plurality of second holes 133 through which the first tie rods 16 pass. To support the collecting electrodes 13, a second reinforcing rod 131 is disposed at an upper portion of each of the collecting electrodes 13. The second reinforcing rod 131 is longer than a width of the collecting electrode 13 and thus protrudes from both sides of the upper portion of the collecting electrode 13.

The plurality of discharge electrodes 12 and the dust collecting electrodes 13 are arranged parallel to each other such that the discharge electrodes 12 are disposed at regular intervals between the dust collecting electrodes 13. The gap G1 between the dust collecting electrode 13 and the discharge electrode 12 may be 50 mm to 70 mm. A ratio G1/H1 of the gap G1 to the height H1 of the dust collecting electrode 13 may be 0.025 to 0.035. When the ratio G1/H1 is 0.025 to 0.035 in this way, the dust collecting efficiency can be maximized with a relatively low charging voltage.

A high voltage is applied to the discharge electrode 12, so that a corona discharge occurs between the discharge electrode 12 and the dust collecting electrode 13 to generate an electrostatic force. In the present disclosure, a high voltage may be in a range of 10 KV to 120 KV. The discharge electrode 12 can be charged to a predetermined voltage, and the predetermined voltage may be in a range of 10 KV to 120 KV.

In other words, the dust collecting module 100 includes an arrangement of a plurality of the discharge electrodes 12 and a plurality of the collecting electrodes 13, which are alternately disposed and spaced apart from each other, and the discharge electrodes 12 are charged to a predetermined high voltage for generating a corona discharge between the electrodes 12 and 13.

During the flow of exhaust gas towards the region where the corona discharge and the electrostatic force are generated, particulate matter is combined with ions (electrons) generated by the corona discharge and is charged, and the charged particulate matter is attached to the dust collector 13 by the electrostatic force.

The height H1 of the dust collecting electrode 13 may be 1.8 m to 2.0 m, and the flow rate (GS1) of the exhaust gas passing through the dust collecting module 100 may be 4.0 m/s to 4.5 m/s. Accordingly, a ratio (GS1/H1) of the flow rate of exhaust gas to the height of the dust collecting electrode 13 may be 2.0 to 2.5. Within this range of GS1/H1 ratios, the volume of the absorption tower 1200 can be reduced and the dust collecting efficiency can also be remarkably improved.

The support network 10 is provided on the discharge electrode 12 and the dust collecting electrode 13 to maintain the gap between the discharge electrode 12 and the dust collecting electrode 13. The support network 10 includes a first tie rod 16, a second tie rod 17, a first setting beam 14, a second setting beam 15, and a center setting beam 18.

The first tie rod 16 is fitted into and coupled to the plurality of discharge electrodes 12 through the second holes 133 formed in the dust collecting electrodes 13 without being in contact with the dust collecting electrodes 13. The first tie rods 16 are provided on respective upper and lower sides of the discharge electrode 12.

A longitudinal end of each first tie rod 16 is threaded. Among the first tie rods 16, those disposed on the lower side are fixed to a lower support 51, and those disposed on the upper side are fixed to an upper support 61.

The second tie rods 17 are fitted into and coupled to the plurality of dust collecting electrodes 13 through the first holes 123 formed in the discharge electrodes 12 without being in contact with the discharge electrodes 12.

The second tie rods 17 may be respectively coupled to the upper and lower sides of the dust collecting electrode 13 and longitudinal ends of the second tie rods 17 may be fixed to the dust collecting electrode 13, though the present disclosure is not limited to this configuration. That is, the second tie rods 17 may be fixed to another member in the absorption tower 1200.

The first tie rod 16 and the second tie rod 17 may be provided with spacers for maintaining the gap between the discharge electrodes 12 and the dust collecting electrodes 13. The spacer of the discharge electrode 12 passes through the second hole 133 such that the spacer's longitudinal end abuts the surface of the discharge electrode 12. The spacer of the dust collecting electrode 13 passes through the first hole 123 such that the spacer's longitudinal end abuts the surface of the dust collecting electrode 13.

Figure 5:
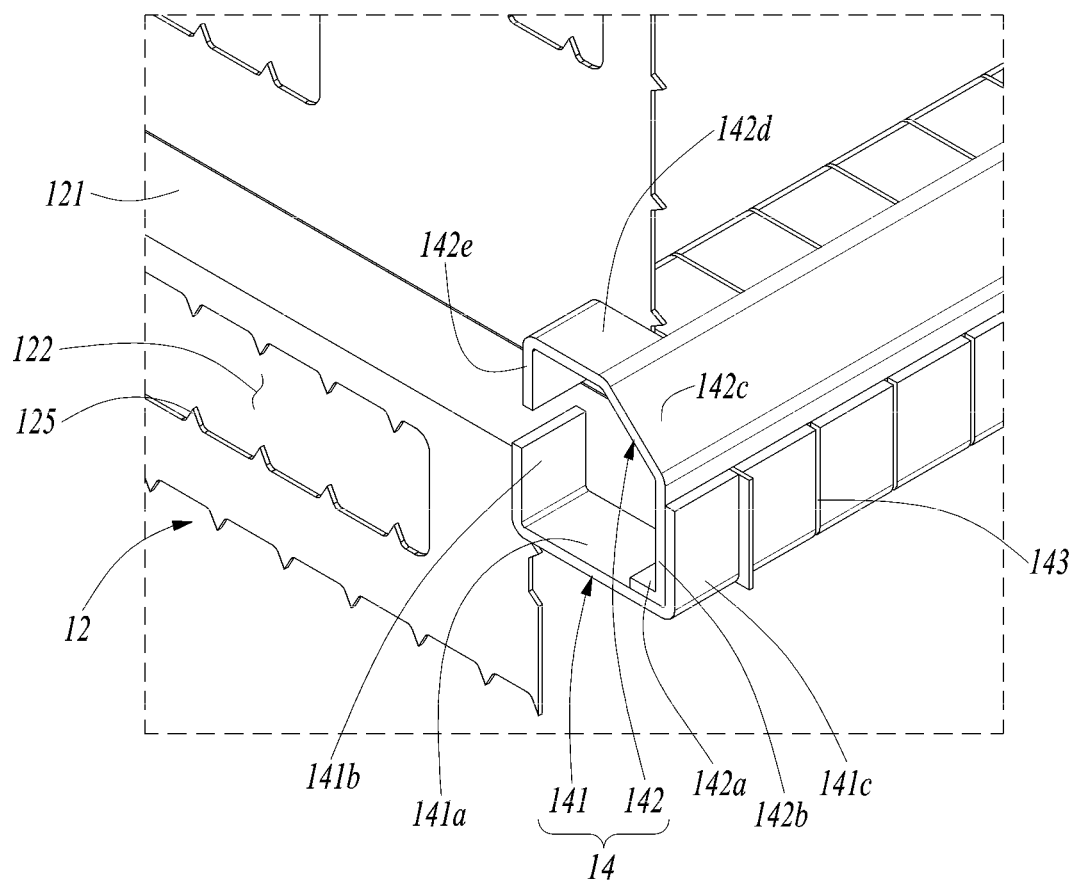
FIG. 5 is a perspective view showing a first setting beam and a discharge electrode according to the first embodiment of the present invention.

FIG. 5 illustrates the coupling of a first setting beam and a discharge electrode according to the first embodiment of the present invention.

Referring to FIG. 5, the first setting beam 14 is formed to extend in the stacking direction of the discharge electrodes 12, and has a plurality of lower slots 143 into which the side ends of the discharge electrodes 12 are inserted. The first reinforcing rod 121 is inserted into the first setting beam 14 such that a lower end of the first reinforcing rod 121 is supported by the first setting beam 14.

The first setting beam 14 may include a lower beam 141 and an upper beam 142 coupled to the lower beam 141. The lower beam 141 has a bottom portion 141*a* and two sidewalls 141*b* and 141*c*, the sidewalls 141*b* and 141*c* each including a right-angle bend and protruding upwards from both side ends of the bottom portion 141*a*. The upper beam 142 includes a lower support portion 142*a* contacting the bottom portion 141*a*; an outer support portion 142*b* bent to extend upward from the lower support portion 142*a* and to abut the sidewall 141*c*; an inclined portion 142*c* bent to be inclined from the outer support portion 142*b*; an upper support portion 142*d* bent from the inclined portion 142*c* to be parallel with and spaced apart from the bottom portion 141*a*; and an inner support portion 142*e* bent downward from the upper support portion 142*d*. Moisture can be easily discharged to the outside through the inclined portion 142*c*.

The lower slots 143 are formed in the sidewalls 141*b* and 141*c* and are not formed in the bottom portion 141*a*. The lower slots 143 are also provided in the upper beam 142 at the lower support portion 142*a* and the outer support portion 142*b*. The lower slots 143 formed in the lower and upper beams 141 and 142 communicate with each other, and the first reinforcing rods 121 protrude to the outside through the lower slots 143 formed in the outer sidewall 141*b* and the outer support portion 142*b*.

When the upper beam 142 and the lower beam 141 are coupled to each other, the first setting beam 14 is formed into a tubular shape with one side surface cut out. When the first setting beam 14 is divided into the upper beam 142 and the lower beam 141, the first setting beam 14 can be easily welded to the lower beam 141. That is, in a state in which the discharge electrode 12 is welded to the lower beam 141, when the upper beam 142 is coupled to the lower beam 141 and the discharge electrode 12 is welded to the upper beam 142, the discharge electrode 12 can be stably fixed to the first setting beam 14 with the first setting beam 14 formed into a tubular form.

The first reinforcing rod 121 may be made of the same material as the first setting beam 14, and may be thicker than the discharge electrode 12. Thus, the first reinforcing rod 121 may be easily welded to the first setting beam 14. The discharge electrode 12 should have a minimized thickness and excellent electric conductivity. However, if the discharge electrode 12 is thin and highly conductive, there is a problem in that welding is difficult. As described above, according to the first embodiment, since the discharge electrode 12 includes the first reinforcing rod 121, the discharge electrode 12 can be easily welded to the first setting beam 14.

Figure 6:
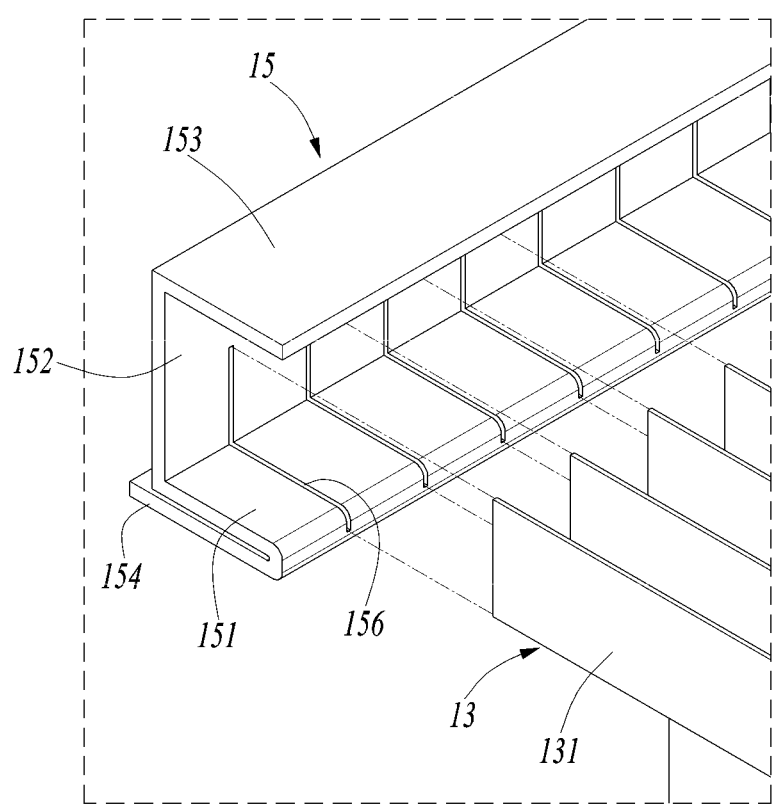
FIG. 6 is a perspective view showing a second setting beam and a dust collecting electrode according to the first embodiment of the present invention.

FIG. 6 illustrates the coupling of a second setting beam and a dust collecting electrode according to the first embodiment of the present invention.

Referring to FIG. 6, the second setting beam 15 is formed to extend in the stacking direction of the dust collecting electrodes 13, and has a plurality of upper slots 156 into which the side ends of the dust collecting electrodes 13 are inserted. The upper slots 156 may be spaced along a longitudinal direction of the second setting beam 15, and the second setting beam 15 may be located above the first setting beam 14. In the meantime, as illustrated in FIG. 3, a central setting beam 18 is disposed at the widthwise center of the upper end of the dust collecting electrode 13, wherein the central setting beam 18 is formed in a T-shape and has a plurality of slots for receiving an insertion of the upper center of the dust collecting electrode 13.

The second reinforcing rod 131 is fixed to the upper end of the dust collecting electrode 13 through the second setting beam 15. The second reinforcing rod 131 is installed to penetrate the second setting beam 15 such that a lower end of the second reinforcing rod 131 is supported by the second setting beam 15.

The second setting beam 15 includes a lower plate 151, a side plate 152 bent upward from the lower plate 151, an upper plate 153 bent from the side plate 152 to be disposed opposite to the lower plate 151, and a support plate 154 disposed below and parallel with the lower plate 151. A second reinforcing rod 131 is inserted into the lower plate 151 and a lower part of the side plate 152 such that an end portion of its lower edge abuts an upper surface of the support plate 154. The second reinforcing rod 131 may be welded to the second setting beam 15.

As described above, the dust collecting module 100 according to the first embodiment includes the first tie rod 16, the second tie rod 17, the first setting beam 14, and the second setting beam 15, thereby having an effect of stably fixing the discharge electrodes and the dust collecting electrodes while maintaining a distance therebetween.

Figure 7:
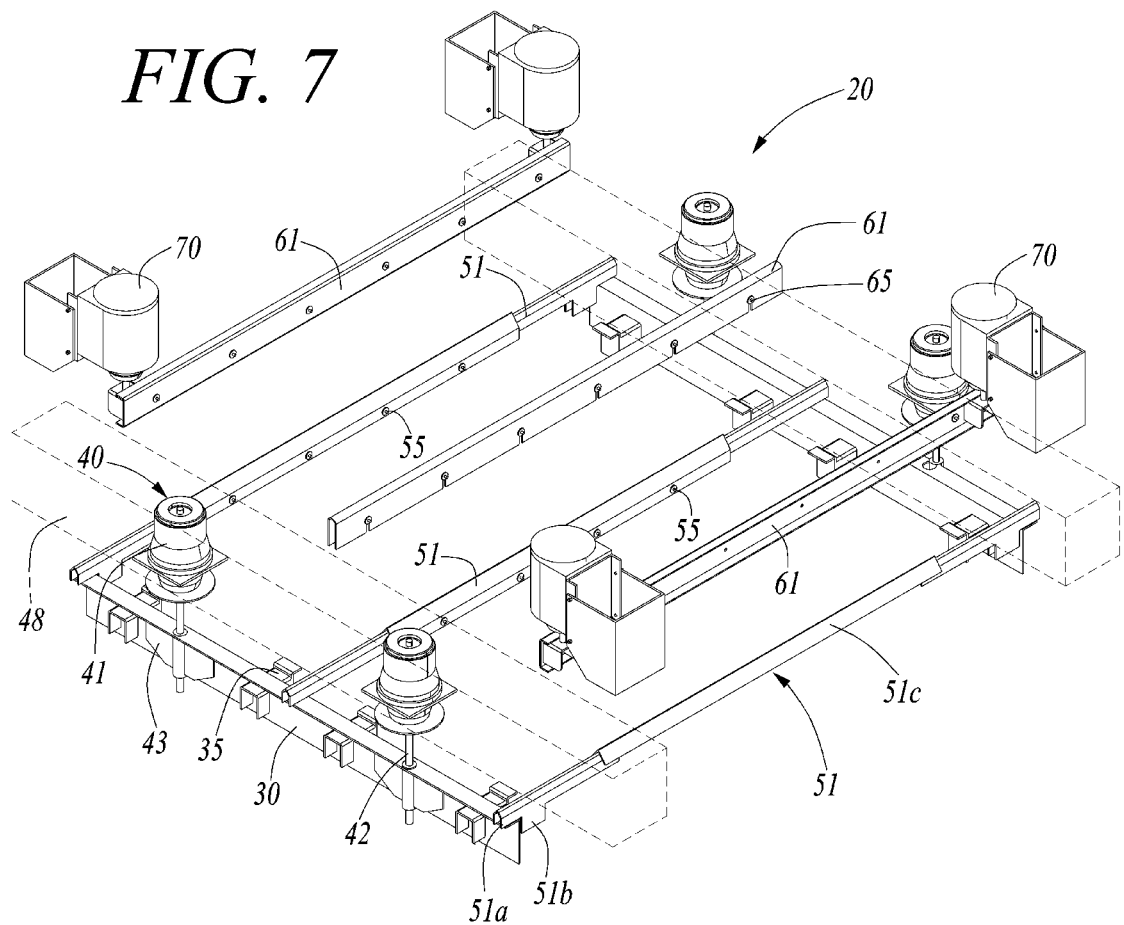
FIG. 7 is a perspective view showing a frame assembly according to the first embodiment of the present invention.
Figure 8:
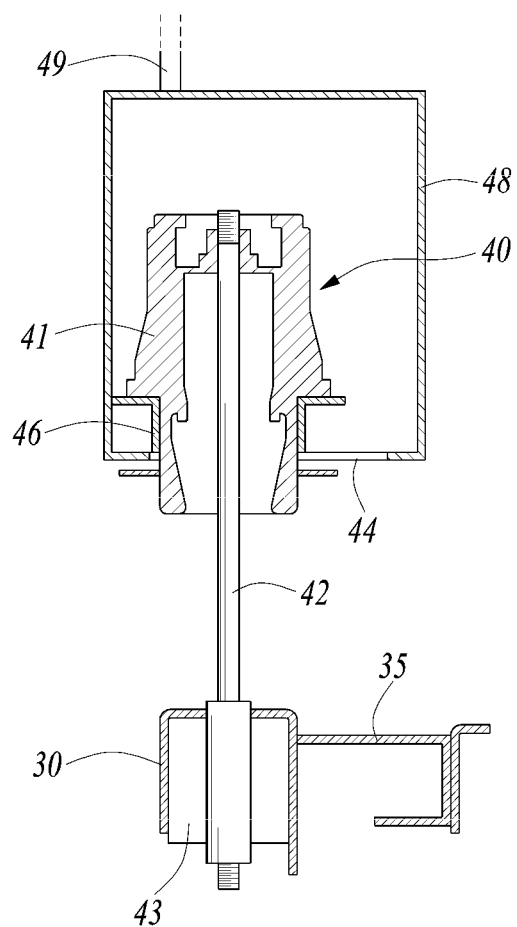
FIG. 8 is a sectional view showing an insulating connecting member and a lower frame according to the first embodiment of the present invention.

FIG. 7 illustrates a frame assembly according to the first embodiment of the present invention, and FIG. 8 illustrates an insulating connecting member and a lower frame according to the first embodiment.

Referring to FIGS. 7 and 8, the frame assembly 20 includes lower frames 30, a tubular girder 48, upper supports 61, lower supports 51, locking members 70, and insulating connecting members 40.

The lower frames 30 are formed to extend in the stacking direction of the discharge electrodes 12 and the dust collecting electrodes 13 and are supported by the insulating connecting members 40. Two lower frames 30 are arranged in parallel, and two insulating connecting members 40 are provided to each lower frame 30. The lower frames 30 are provided with a plurality of cradles 35 protruding inward, towards the inner surface of the opposite lower frame 30, and the first setting beams 14 are mounted on the cradles 35. The lower frame 30 is charged to a high voltage through an application of the predetermined high voltage, and thus the first setting beam 14 and the discharge electrodes 12 are charged to the same high voltage through the lower frame 30.

The lower supports 51 are fixed to the lower frames 30 on the outer sides of and at the center of the dust collection module 100, respectively. The lower support 51 includes side protrusions 51a positioned on the lower frames 30, lower protrusions 51b projecting downward to abut the side surface of the lower frame 30, and a support bar 51c to which the first tie rod 16 is fixed.

The lower support 51 is provided with a plurality of connectors 55 to which the first tie rods 16 are screw-coupled. Longitudinal ends of the first tie rods 16 are respectively fixed between the central lower support 51 and one or the other of the outer lower supports 51.

As described above, according to the first embodiment, the dust collecting module 100 can be easily fixed to the frame assembly 20 by fastening the first tie rods 16 to the lower supports.

The lower frames 30 are provided with the insulating connecting members 40 each having a high voltage terminal rod 42 for applying the high voltage to the discharge electrode 12 and a lower insulator 41. A hole for injecting air downward may be formed in the lower portion of the insulating connecting member 40. The high voltage terminal rod 42 protrudes downward through the hole and is fixed to the lower frame 30. The high voltage terminal rod 42 is provided with an anchor 43 for supporting the lower frame 30.

Accordingly, a high voltage is applied to the discharge electrode 12 through the lower frames 30 and the first setting beams 14. Further, the lower frames 30 are installed in a state of being suspended from the insulating connecting members 40.

The insulating connecting member 40 is installed in the tubular girder 48 having an inner space, and the tubular girder 48 is formed to extend in the same direction as the lower frame 30. The tubular girder 48 may be fixedly installed on an inner wall of the absorption tower 1200 and may be provided with a purge air supply pipe 49. A vent hole 44 may be provided on the lower side of the tubular girder 48 to discharge purge air.

A support 46 is provided in the tubular girder 48 to support the lower insulator 41, which is held on the support 46. A high voltage source is connected to the insulating connecting member 40, and the high voltage terminal rod 42 is fixed to the tubular girder 48 via the lower insulator 41 for electric insulation. Accordingly, the high voltage terminal rod 42 may be charged with the predetermined high voltage, and the tubular girder 48 may be grounded.

The second setting beams 15 are fixed to an upper surface of the tubular girder 48 such that their lower ends are fixed to the tubular girder 48 by means of welding or the like. The second setting beams 15 are arranged to extend in the same direction as the longitudinal direction of the tubular girder 48.

The upper supports 61 are disposed on an upper side of the dust collecting module 100 on both outer sides of and at the center of the upper side, respectively. The upper support 61 is provided with a plurality of connectors 65 to which the first tie rods 16 are screw-coupled and fixed. Longitudinal ends of the first tie rod 16 are respectively fixed between the center upper support 61 and one or the other of the outer upper supports 61.

The locking members 70 are connected to the outer upper supports 61. The locking members 70 are fixedly mounted on the outer upper supports 61 while applying a compressing force inwards to the outer upper support 61 to reduce the vibration of the dust collecting module 100.

The locking member 70 is fixed to an inner wall of the absorption tower 1200, and internally has an insulator 75 and an air spray nozzle to prevent a short circuit. Also, a purge air supply pipe (not shown) may be connected to the locking member 70.

The locking member 70 may have a connection rod 71 protruding downwards, and a compressing support 72 coupled to the lower side of the connection rod 71 to centrally compress the upper support 61. As such, when the upper support 61 is installed in a compressed state, the vibration of the dust collecting module 100 can be efficiently reduced.

Hereinafter, a method of installing the dust collecting module according to the first embodiment of the present invention will be described with respect to the flowchart of FIG. 9.

Figure 9:
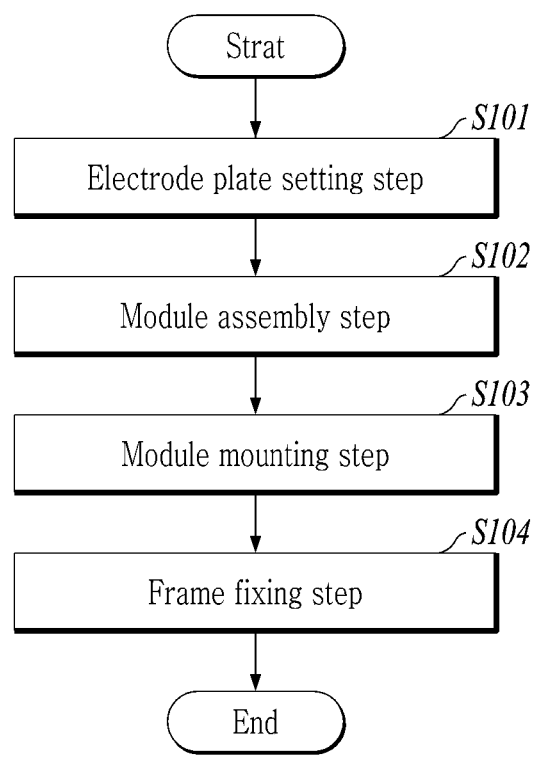
FIG. 9 is a flowchart showing a method of installing the dust collecting module according to the first embodiment of the present invention.

Referring to FIGS. 2 and 9, the installing method includes an electrode plate setting step S101, a module assembly step S102, a module mounting step S103, and a frame fixing step S104.

The electrode plate setting step S101 includes inserting the plates of the plurality of discharge electrodes 12 into the first setting beam 14 having the lower slots 143 and inserting the plates of the plurality of dust collecting electrodes 13 into the second setting beam 15 having the upper slots 156 so that the dust collecting electrodes 13 are disposed between the discharge electrodes 12. The module assembly step S102 fixes the discharge electrodes 12 with the first tie rods 16 and fixes the dust collecting electrodes 13 with the second tie rods 17. Here, the first tie rods 16 are inserted into the second holes 133 of the dust collecting electrodes 13 and the second tie rods 17 are inserted into the first holes 123 of the discharge electrodes 12.

The module mounting step S103 mounts the assembled dust collecting module 100 on the frame assembly 20 installed inside the absorption tower 1200. In the module mounting step S103, the dust collecting module 100 is inserted into the absorption tower 1200 such that the first setting beams 14 are mounted on mounts of the lower frames 30.

The frame fixing step S104 fixes the first tie rods 16 to the lower supports 51 fixed to the lower frames 30, and the upper supports 61 fixed to the locking members. In the frame fixing step S104, the lower-side first tie rods 16 are screwed to the connectors 55 provided on the lower supports 51, and the upper-side first tie rods 16 are screwed to the connectors 55 provided on the upper supports 61.

In the frame fixing step S104, the locking members 70 compress and fix the upper supports 61 to prevent vibration of the dust collecting module.

Hereinafter, a dust collecting module according to a second embodiment of the present invention will be described.

Figure 10:
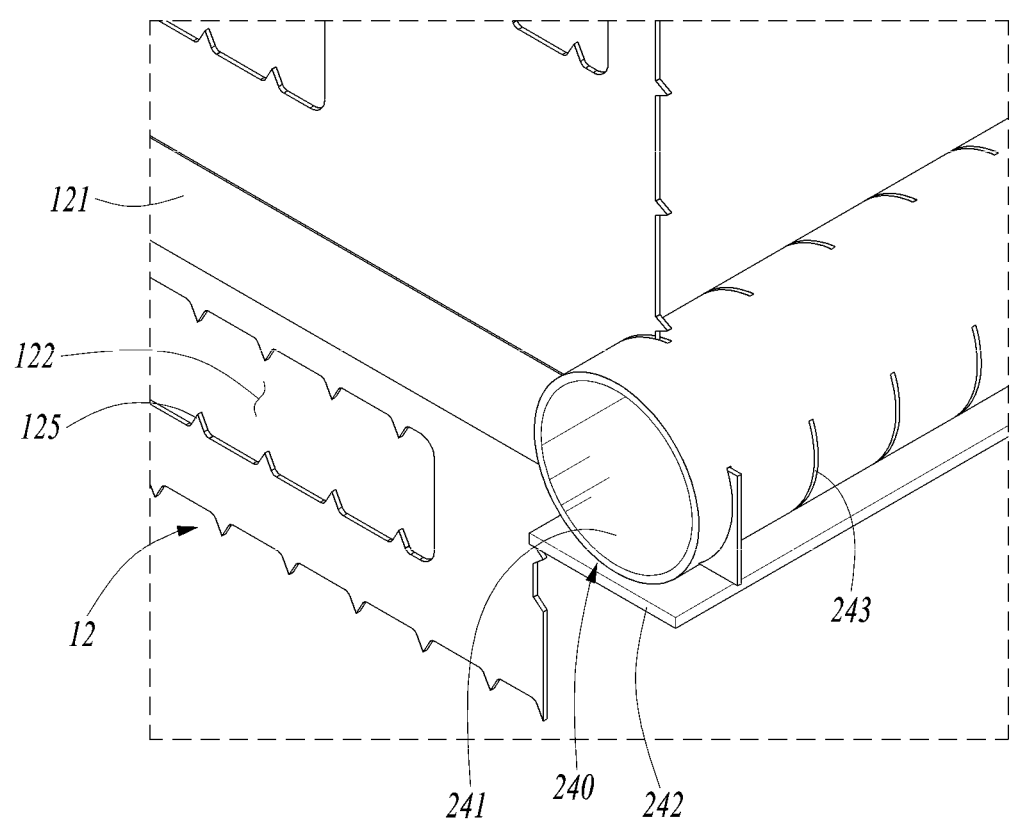
FIG. 10 is a perspective view showing a first setting beam and a discharge electrode according to a second embodiment of the present invention.

FIG. 10 shows the coupling of a first setting beam and a discharge electrode according to the second embodiment of the present invention. The dust collecting module according to the second embodiment has the same structure as that of the desulfurizing apparatus according to the first embodiment except for the structure of a first setting beam, so a repeated description of the same constitution will be omitted.

Referring to FIG. 10, the first setting beams 240 are formed to extend in the stacking direction of the discharge electrodes 12, and each has a plurality of lower slots 243 into which the side ends of the discharge electrodes 12 are inserted. A first reinforcing rod 121 is inserted into the first setting beam 240 such that the lower end of the first reinforcing rod 121 is supported by the first setting beam 240.

The first setting beam 240 includes a tubular support tube 241 having a circular cross section and a lower support plate 242 fixed to the lower end of the support tube 241. A plurality of lower slots 243 are formed in the support tube 241, and the first reinforcing rod 121 and the discharge electrode 12 are inserted into the lower slot 243.

On the other hand, the lower support plate 242 has a flat plate shape and is fixed to the lower side of the support tube 241. The lower support plate 242 abuts the lower surface of the first reinforcement rod 121 to support the first reinforcement rod 121.

As described above, according to the second embodiment, the first setting beam 240 and the discharge electrode 12 can be more easily coupled.

Hereinafter, a dust collecting module according to a third embodiment of the present invention will be described.

Figure 11:
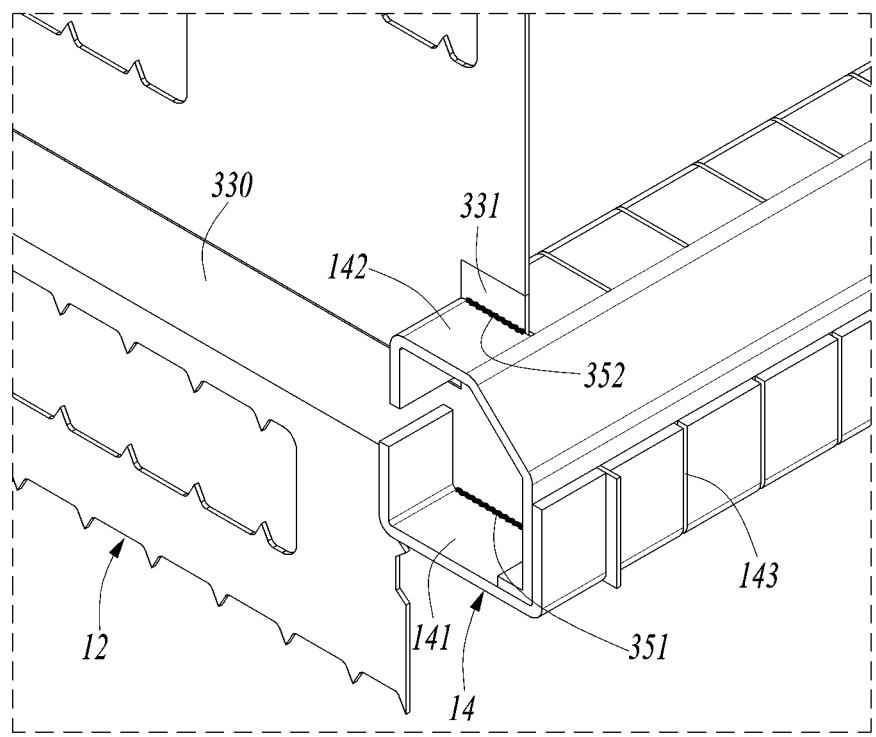
FIG. 11 is a perspective view showing a first setting beam and a discharge electrode according to a third embodiment of the present invention.

FIG. 11 shows the coupling of a first setting beam and a discharge electrode according to the third embodiment of the present invention. The dust collecting module according to the third embodiment has the same structure as that of the dust collecting module according to the first embodiment except for the structure of a first reinforcing rod 330, so a repeated description of the same structure will be omitted.

Referring to FIG. 11, the discharge electrode 12 includes a first reinforcing rod 330 installed at a lower portion of the plate, where the first reinforcing rod 330 is coupled to the first setting beam 14 to support the discharge electrode 12. The first reinforcing rod 330 is formed to be longer than the width of the discharge electrode 12 so as to protrude from both side ends of the discharge electrode 12. The first reinforcing rod 330 may be joined to the first setting beam 14 by means of a first weld 351.

The first reinforcing rod 330 is formed with a support protrusion 331 protruding upward. The support protrusion 331 is installed to pass through the upper end of the first setting beam 14 and may be welded to the first setting beam 14. The support protrusion 331 is joined to the first setting beam 14 by means of a second weld 352.

The first setting beam 14 is formed to extend in the stacking direction of the discharge electrodes 12 and has the plurality of lower slots 143 into which the side ends of the discharge electrodes 12 are inserted. The first reinforcing rod 330 is installed in the first setting beam 14 so that the first reinforcing rod 330 passes through the first setting beam 14 and the lower end of the first reinforcing rod 330 is supported by the first setting beam 14.

The first setting beam 14 may include a lower beam 141 and an upper beam 42 coupled to the lower beam 141. The first weld 351 welds an extension of the first reinforcing rod 330, which extends in the longitudinal direction of the discharge electrode, and the lower beam 141 while the second weld 352 welds the support protrusion 331 and the upper beam 142.

As described above, according to the third embodiment, the support protrusion 331 is formed on the first reinforcement rod 330 and the first reinforcing rod 330 is connected to the first setting beam 14 by the first weld 351 and the second weld 352, so that the discharge electrode 12 can be more stably fixed.

Figure 12:
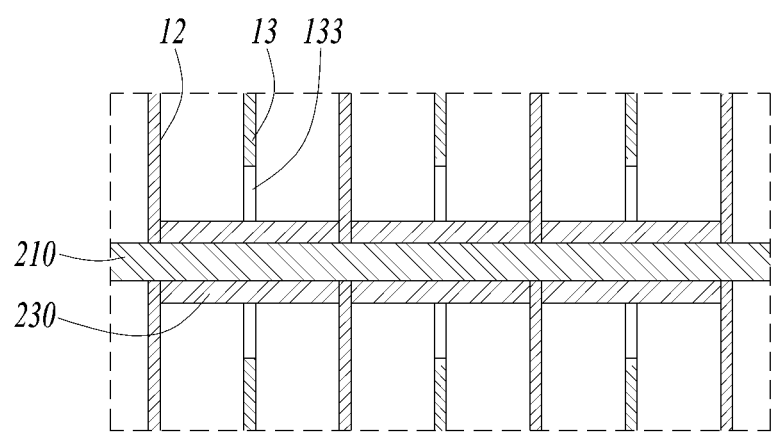
FIG. 12 is a cross-sectional view showing a portion of a dust collecting module according to a fourth embodiment of the present invention.

Hereinafter, a desulfurizing apparatus according to a fourth embodiment of the present invention will be described. FIG. 12 shows part of a dust collecting module according to the fourth embodiment of the present invention. The desulfurizing apparatus according to the fourth embodiment has the same structure as the desulfurizing apparatus according to the first embodiment except for a structure for installing the first tie rod 210 in the dust collecting module, so a repeated description of the same configuration will be omitted.

Referring to FIG. 12, the first tie rod 210 is fixed to the discharge electrode 12 so as to pass through the second hole 133 formed in the dust collecting electrode 13. The first tie rod 210 is provided with spacers 230 between the discharge electrodes 12 to maintain a distance therebetween. The longitudinal ends of the spacers 230 are in contact with adjacent discharge electrodes 12, respectively, and the spacers 230 are installed to pass through the second holes 133 of the dust collecting electrode 13.

Also, spacers for maintaining the distance between the dust collecting electrodes may also be provided on the second tie rods. When the first tie rod 210 and the second tie rod are provided with the spacers 230 as in this embodiment, the discharge electrodes 12 and the dust collecting electrodes 13 can be more stably fixed.

Hereinafter, a desulfurizing apparatus according to a fifth embodiment of the present invention will be described.

Figure 13:
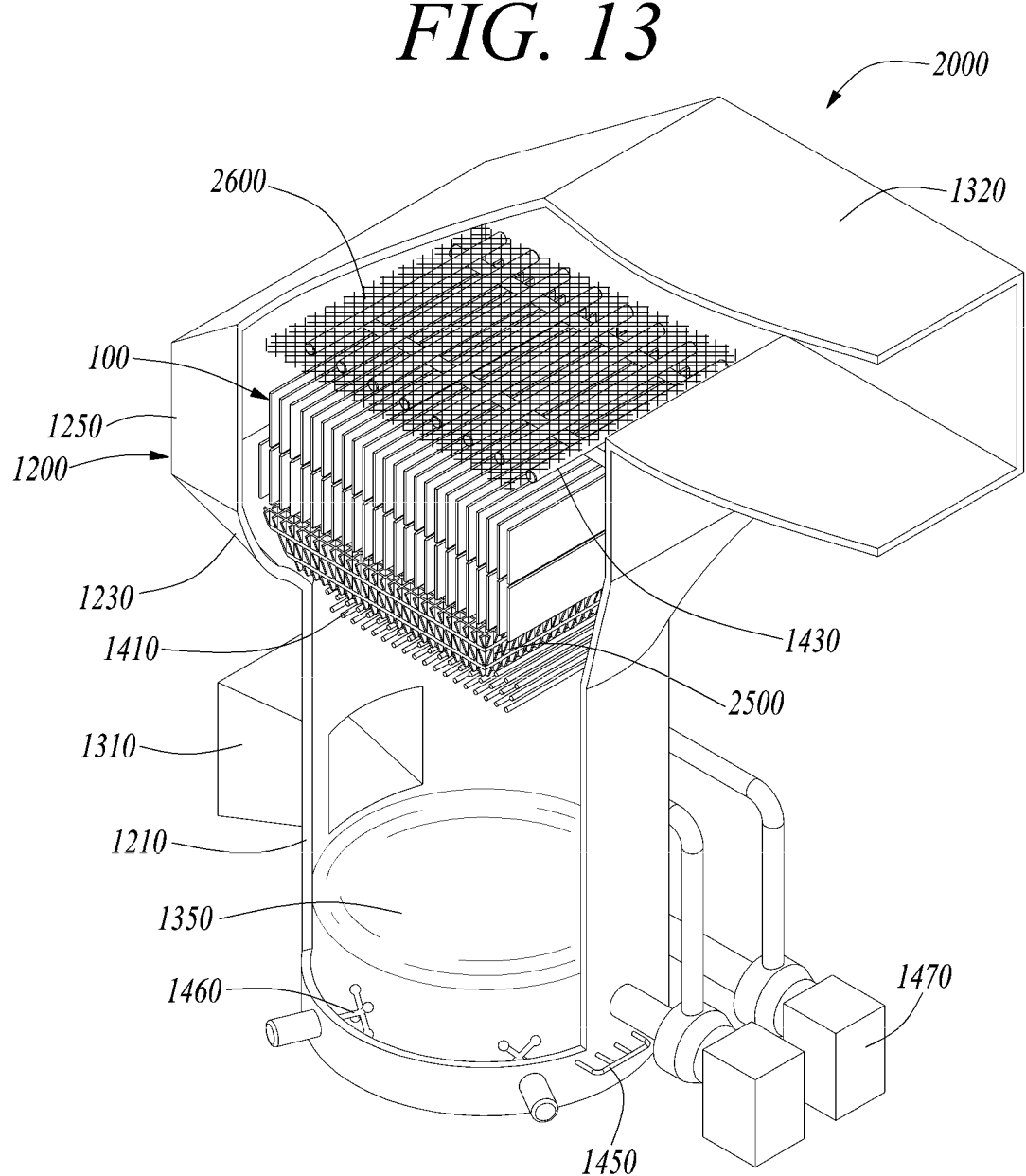
FIG. 13 is a view showing a desulfurizing apparatus according to a fifth embodiment of the present invention.
Figure 14:
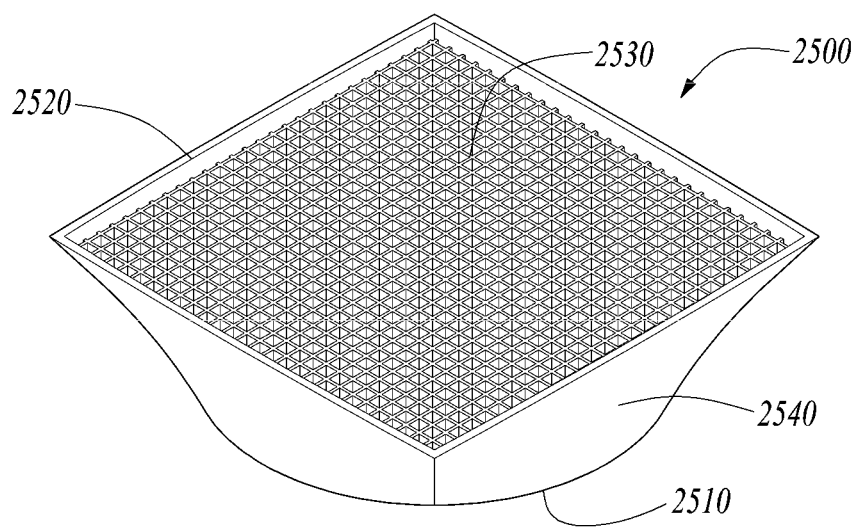
FIG. 14 is a perspective view showing a flow guide member according to the fifth embodiment of the present invention.

FIG. 13 shows a desulfurizing apparatus 2000 according to a fifth embodiment of the present invention, and FIG. 14 shows the flow guide member of FIG. 13. The desulfurizing apparatus 2000 has the same configuration as that of the desulfurizing apparatus according to the first embodiment, except for a flow guide member 2500 and an upper perforated plate 2600, so a repeated description of the same configuration will be omitted Referring to FIGS. 13 and 14, an absorption tower 1200 includes a cylindrical column section 1210 having a circular cross section, a rectangular column section 1250 formed on the upper part of the circular column section 1210 and having a rectangular cross section, and an intermediate section 1230 connecting the circular column section 1210 and the rectangular column section 1250.

An upper perforated plate 2600 for removing water is provided on an upper part of the cleaning water supply unit 1430. The upper perforated plate 2600 may be a perforated or meshed plate. When the upper perforated plate 2600 is installed as described above, the occurrence of white smoke can be reduced by removing moisture.

A flow guide member 2500 is installed in the intermediate section 1230. The flow guide member 2500 includes a housing 2540 having a lower circular inlet 2510, an upper rectangular outlet 2520, and partition walls. The housing 2540 is inserted into the intermediate section 1230 and has a shape corresponding to the contour of the intermediate section.

The partition walls are installed in a lattice formation to form an inner flow path 2530. The partition walls are formed to extend from the lower inlet 2510 to the upper outlet 2520. The inner flow path 2530 extends such that its cross-sectional area gradually increases from the lower part to the upper part.

As described above, according to the fifth embodiment, the exhaust gas can be uniformly dispersed from the lower circular section to the upper rectangular section by the flow guide member 2500, thereby improving the dust collecting efficiency.

While the exemplary embodiments of the present invention have been described in the detailed description, the present invention is not limited thereto, but should be construed as including all of modifications, equivalents, and substitutions falling within the spirit and scope of the invention defined by the appended claims.

What is claimed is:

1. A dust collecting module comprising:
    an arrangement of discharge electrodes and dust collecting electrodes alternately disposed and spaced apart from each other, the discharge electrodes configured to be charged to a predetermined voltage for generating a corona discharge between the discharge electrodes and the dust collecting electrodes;
    a first setting beam having a plurality of slots into which the discharge electrodes are securely inserted; and
    a lower frame extending in a stacking direction of the discharge electrodes to support the discharge electrodes,
    wherein the predetermined voltage is applied to the discharge electrodes through the lower frame and the first setting beam.

2. The dust collecting module of claim 1, further comprising
    an insulating connecting member having a lower insulator an insulator and a high voltage support rod, and
    wherein the lower frame is suspended from the insulating connecting member.

3. The dust collecting module of claim 2,
    wherein the insulating connecting member consists of a plurality of insulating connecting members, and
    wherein the dust collecting module further includes a tubular girder through which the plurality of insulating connecting members are inserted such that the insulating connecting members are fixedly installed inside the tubular girder.

4. The dust collecting module of claim 1,
    wherein the discharge electrode is provided with a first reinforcing rod extending in a width direction of the discharge electrode, and
    wherein the first reinforcing rod protrudes from both ends of the discharge electrode and is supported by the first setting beam.

5. The dust collecting module of claim 4, wherein the first reinforcing rod is provided with a support protrusion passed through and joined to the first setting beam.

6. The dust collecting module of claim 4, wherein the first setting beam includes:
    a tubular support tube having a circular cross section; and
    a support plate fixed to one side of the tubular support tube.

7. The dust collecting module of claim 1, wherein the first setting beam comprises:
    a lower beam including an end portion and two sidewalls protruding from the end portion, the plurality of slots of the first setting beam being formed only in the two sidewalls; and
    an upper beam coupled to the lower beam, the upper beam including
        a lower support portion contacting the end portion,
        an outer support portion bent from the lower support portion to abut an outer sidewall of the two sidewalls,
        an inclined portion bent from the outer support portion,
        an upper support portion bent from the inclined portion parallel with and spaced apart from the end portion, and
        an inner support portion bent downwards from the upper support portion.

8. The dust collecting module of claim 7, wherein the first reinforcing rod is fixed to the lower beam of the first setting beam by a first weld, and the support protrusion is fixed to the upper beam of the first setting beam by a second weld.

9. The dust collecting module of claim 1, further comprising:
    two second setting beams each having a plurality of slots for maintaining a gap between the dust collecting electrodes; and
    a central setting beam provided between the two second setting beams,
    wherein the dust collecting electrodes are inserted into the central setting beam.

10. The dust collecting module of claim 9, further comprising a second reinforcing rod installed on one end of the dust collecting electrodes, such that the second reinforcing rod passes through the plurality of slots formed in either of the two second setting beams.

* * * * *